United States Patent
Lin

(10) Patent No.: US 7,068,229 B2
(45) Date of Patent: Jun. 27, 2006

(54) CONCEALED ANTENNA

(75) Inventor: Huei Lin, Taoyuan (TW)

(73) Assignee: Quanta Computer, Inc., Tao Yuan (TW)

( * ) Notice: Subject to any disclaimer, the term of this patent is extended or adjusted under 35 U.S.C. 154(b) by 0 days.

(21) Appl. No.: 10/937,608

(22) Filed: Sep. 10, 2004

(65) Prior Publication Data

US 2005/0062657 A1    Mar. 24, 2005

(30) Foreign Application Priority Data

Sep. 19, 2003    (TW) ................. 92126037 A

(51) Int. Cl.
*H01Q 1/24*    (2006.01)
(52) U.S. Cl. .................................... 343/702
(58) Field of Classification Search ............... 343/702, 343/895, 846; 455/575, 575.7
See application file for complete search history.

(56) References Cited

U.S. PATENT DOCUMENTS

| | | | |
|---|---|---|---|
| 6,133,805 A * | 10/2000 | Jain et al. ................... 333/1 |
| 6,340,952 B1 * | 1/2002 | Tsai et al. ................... 343/741 |
| 6,697,022 B1 * | 2/2004 | Ponce De Leon et al. .. 343/702 |
| 6,885,880 B1 * | 4/2005 | Ali .......................... 455/575.7 |
| 6,917,792 B1 * | 7/2005 | Kim ....................... 455/127.5 |
| 2003/0234743 A1 * | 12/2003 | Ponce De Leon et al. .. 343/702 |
| 2005/0099343 A1 * | 5/2005 | Asrani et al. ............... 343/702 |

FOREIGN PATENT DOCUMENTS

TW    91101096    3/1991

* cited by examiner

*Primary Examiner*—Don Wong
*Assistant Examiner*—Hung Tran Vy
(74) *Attorney, Agent, or Firm*—Rabin & Berdo, PC

(57) ABSTRACT

A concealed antenna is applied to a notebook computer. The notebook computer includes a displaying module and a base module. The displaying module has a hinge, and the base module includes a region for inserting the hinge, a motherboard, a transmission line, and a wireless module. The motherboard includes a positive region and a negative region. The concealed antenna includes a feed-in end and a ground end for respectively electrically coupling with the positive region and the negative region. The concealed antenna, configured in the region for inserting the hinge and installed on the motherboard, transmits antenna signals to the wireless module via the transmission line.

29 Claims, 6 Drawing Sheets

CONCEALED ANTENNA

This application claims the benefit of Taiwan application Serial No. 92126037, filed Sep. 19, 2003, the subject matter of which is incorporated herein by reference.

BACKGROUND OF THE INVENTION

1. Field of the Invention

The invention relates in general to a concealed antenna, and more particularly to a concealed antenna mounted directly on the motherboard of a notebook computer.

2. Description of the Related Art

In a wireless communication system, such as a notebook computer or a mobile phone, an antenna is a device for transmitting and receiving electromagnetic waves. The way that an antenna is designed and the location that it is mounted in the system influences its radiation field pattern, and the quality of signal transmission. Furthermore, how the antenna is configured in the system will have a great effect on the cost of manufacturing the whole system.

Referring to FIG. 1, a schematic view of a conventional notebook computer equipped with a concealed antenna is shown. A notebook computer 100 generally includes a liquid crystal display (LCD) 110 and a base module 120. Two concealed antennas 130 are symmetrically configured to the center of the upper edge of the LCD 110 to enhance the antenna diversity. A RF coaxial cable 132 is provided as a feed-in line of the antenna 130 so that the RF signals can be transmitted between the antenna 130 and the RF module 140 on the base module 120. A sheet of shielding aluminum foil 134 is electrically coupled with the antenna 130 to improve the antenna radiation performance.

However, the above-mentioned structure of the antenna 130 equipped with the RF coaxial cable 132 for transmitting RF signals has the following disadvantages:

1. Insertion loss: for a 100-centimeter-long high quality RF coaxial cable in the market, the insertion loss is 2.9 dB as the RF signal frequency is 2.4 GHz while the insertion loss is 4.7 dB as the RF signal frequency is 5 GHz. Generally, the length of a RF coaxial cable used in the notebook computer is about 20 cm to 90 cm. Therefore, the insertion loss is about 0.58 dB to 2.61 dB as the RF coaxial cable transmits a 2.4 GHz signal while the insertion loss goes up to 0.94 dB to 4.23 dB as the RF coaxial transmits a 5 GHz signal. Owing to the insertion loss, the antenna field pattern has to be concentrated to provide enough antenna gain for transmitting signals to a given distance. As a result, antenna radiation angles will be reduced and dead space in communication will be increased, which directly reduces communication quality.

2. Cost increase: according to the general estimation conducted by antenna manufacturing industry, the above-mentioned RF coaxial cable occupies about 50% of the antenna manufacturing cost. Moreover, as the wireless system is fabricated, additional devices, such as hooks for fixing the RF coaxial cable and fixing pieces for fixing the shielding aluminum foil, are required to fix the RF coaxial cable, which further increases the cost. The labor hours for configuring and positioning the RF coaxial cable will largely increase the fabrication cost.

SUMMARY OF THE INVENTION

It is therefore an object of the invention to provide a concealed antenna. The antenna is directly configured in the remained space of regions on the base module for holding hinges of the LCD, without using the conventional RF coaxial cable to transmit RF signals to the wireless module. Therefore, the cost of manufacturing and fabricating the antenna system can be lowered, and the transmission loss can be reduced, thereby increasing the antenna reliability.

The invention achieves the above-identified objects by providing a concealed antenna applied in a notebook computer. The notebook computer includes a display module having hinges, and a base module. The base module includes regions for inserting the hinges, a motherboard having a positive region and a negative region, a transmission line, and a wireless module. The concealed antenna includes a feed-in end for electrically coupling with the positive region, and a ground end for electrically coupling with the negative region. The concealed antenna, configured in the region for inserting the hinge and installed on the motherboard, sends out signals to the wireless module via the transmission line. Therefore, the conventional RF coaxial cable is not needed, and thus the cost of manufacturing and fabricating the antenna system can be reduced.

The invention achieves the above-identified objects by providing a notebook computer including a display module and a base module. The display module has hinges, and the base module has regions for inserting the hinges so that the display module can be opened and closed relative to the base module via the hinges. The base module includes a motherboard and an antenna, such as a surface mounting device (SMD) typed antenna. The motherboard has a positive hole and a negative hole, located under the region for inserting the hinge. The antenna is configured in the region for inserting the hinge and installed on the motherboard. The antenna includes a feed-in end for inserting into the positive hole, and a ground end for inserting into the negative hole. The base module further includes a transmission line for electrically connecting the antenna and the wireless module. The antenna, configured in the region for inserting the hinge, has good compatibility with the original mechanism of the notebook computer, and shortens significantly its distance from the wireless module, so the transmission loss can be reduced and the system reliability can be enhanced.

Other objects, features, and advantages of the invention will become apparent from the following detailed description of the preferred but non-limiting embodiments. The following description is made with reference to the accompanying drawings.

DETAILED DESCRIPTION OF THE INVENTION

The main feature of the concealed antenna in the invention is that the antenna is configured in the region on the base module for inserting the hinge of the LCD module. The motherboard is provided for fixing the antenna and connecting the feed-in point of the antenna. High-frequency energy transmission between the feed-in point of the antenna and the wireless module can be directly carried out via a stripline or a microstrip-line disposed on the motherboard without using the conventional RF coaxial cable. Therefore, the cost of manufacturing the antenna system and fabricating the notebook computer can be reduced significantly.

Figure 1:
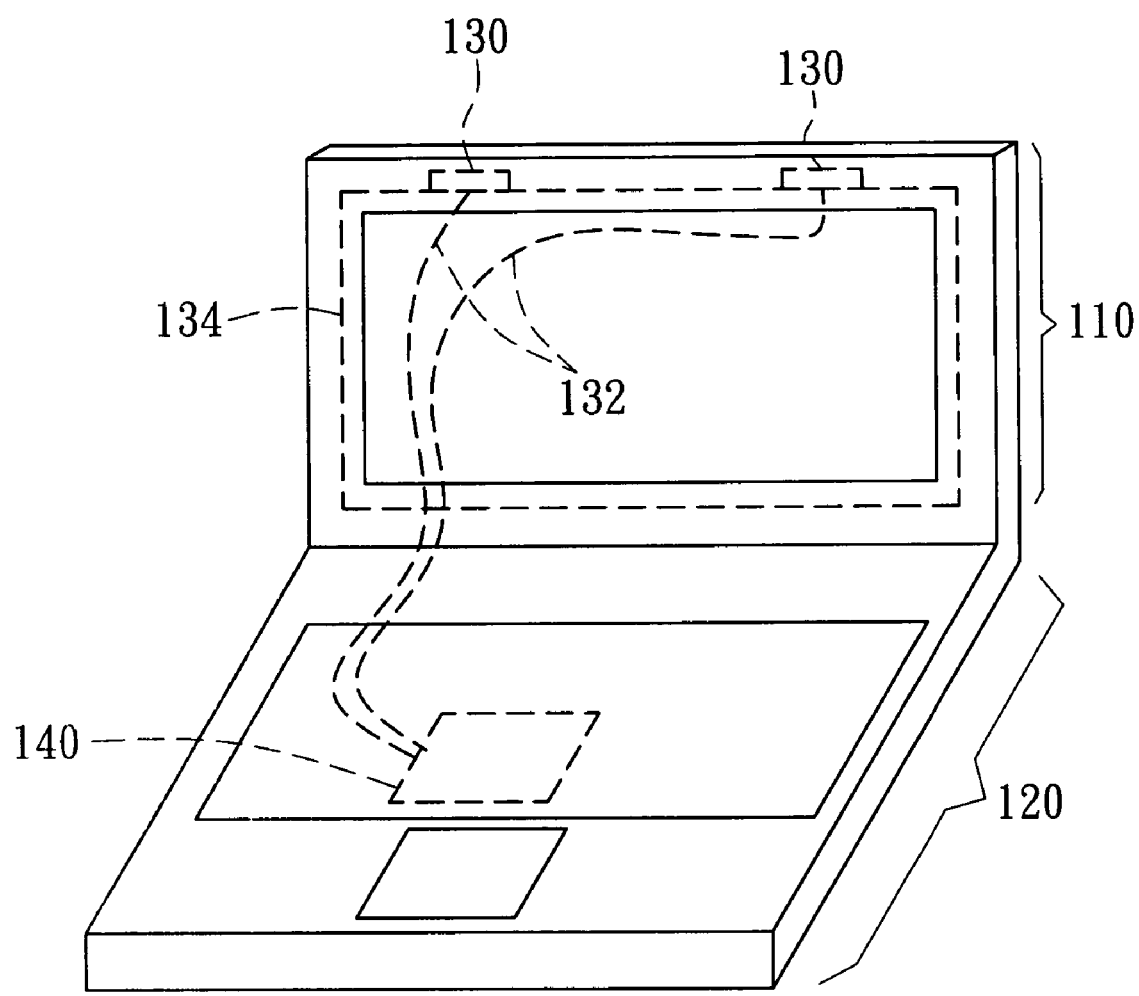
FIG. 1 (Prior Art) is a schematic view of a conventional notebook computer equipped with a concealed antenna.
Figure 2A:
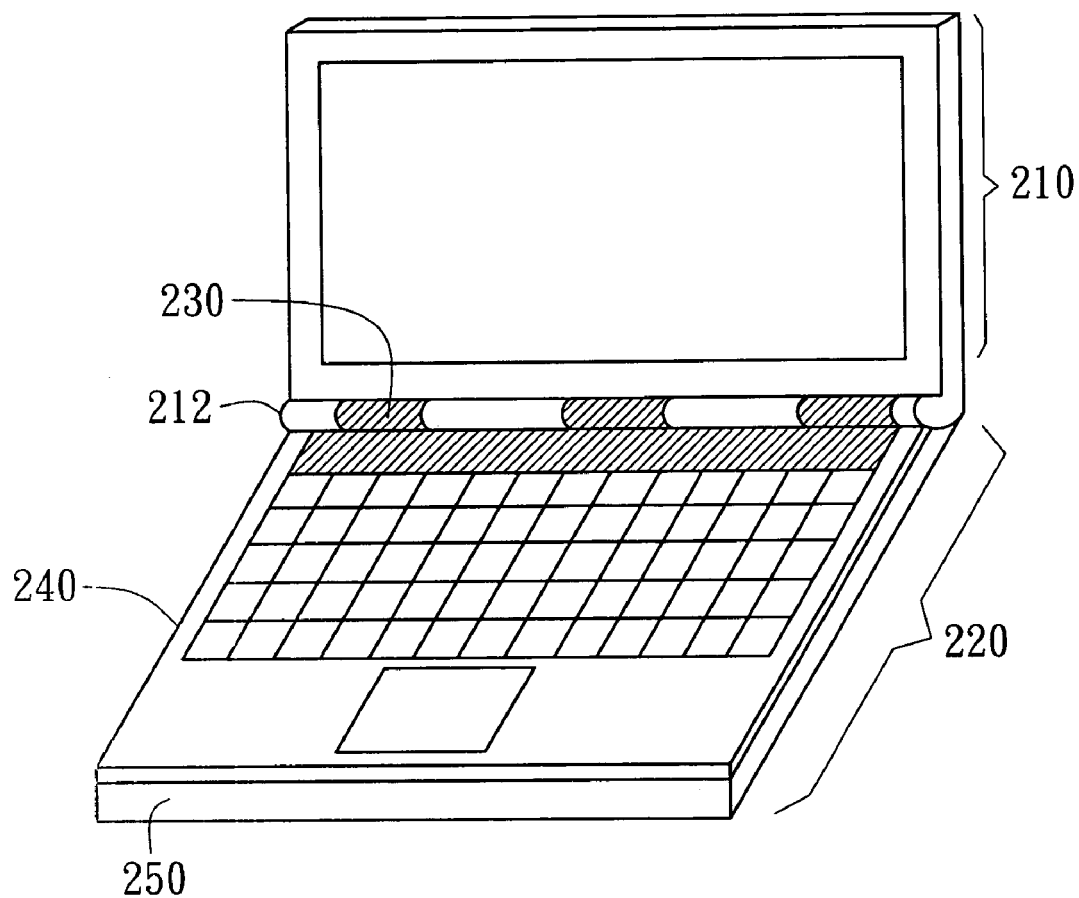
FIG. 2A is a perspective view of a notebook computer having a concealed antenna according to a preferred embodiment of the invention.
Figure 2B:
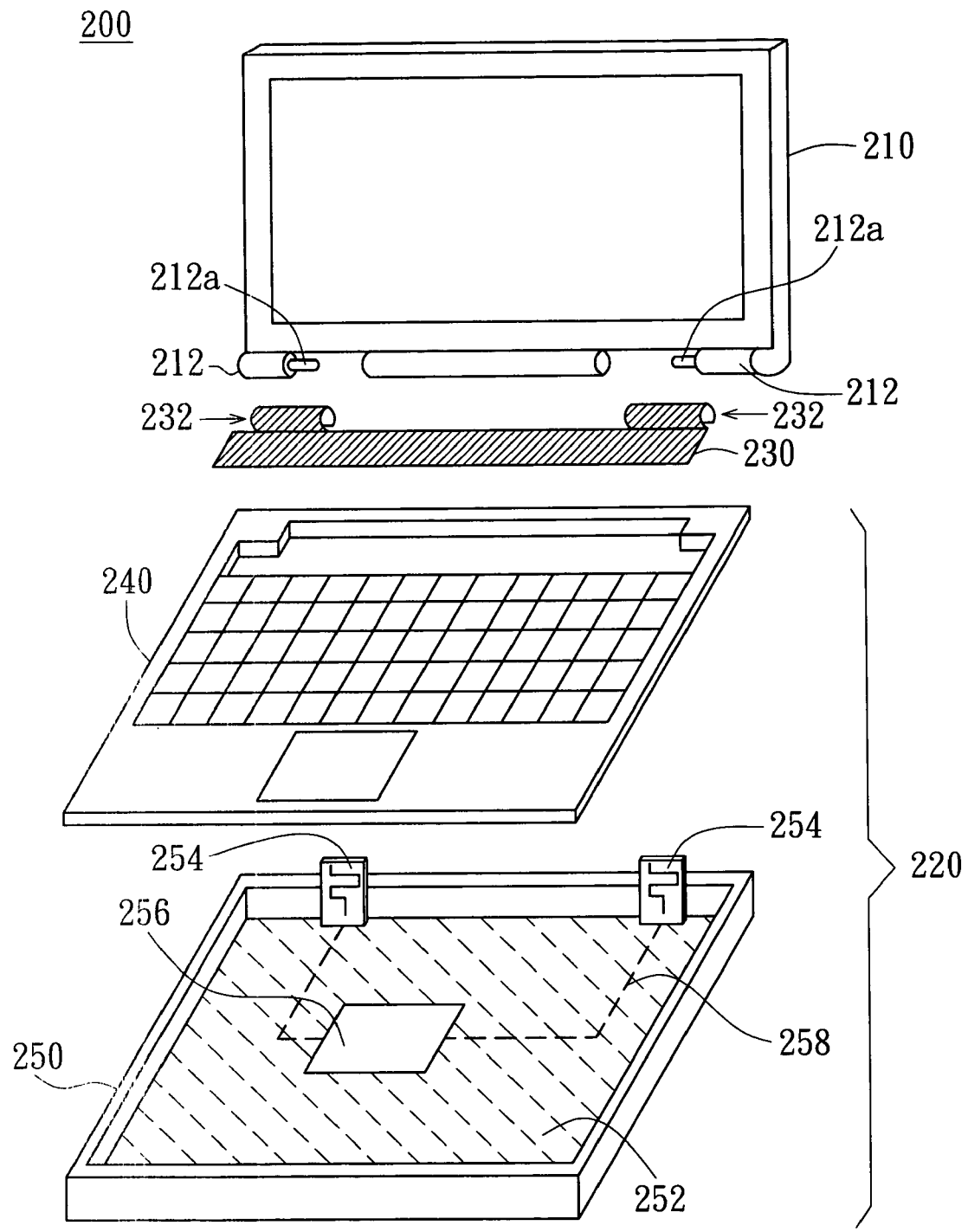
FIG. 2B is an exploded view of the notebook computer in FIG. 2A.

Referring to FIG. 2A and FIG. 2B, a perspective view and an exploded view of a notebook computer having a concealed antenna according to a preferred embodiment of the invention are shown. The notebook computer 200 includes a LCD module 210 and a base module 220. The LCD module 210 has hinge parts 212, and the base module 220 includes a hinge cover 230, an upper cover 240, and a base 250. In FIG. 2B, the hinges 212a at the hinge parts 212 of the LCD module 210 are installed in the regions 232 on the hinge cover 230 for inserting the hinges 212a, and then the hinge cover 230 and the upper cover 240 are integrated with the base 250 to form the notebook computer 200 as shown in FIG. 2A. The base 250 includes a motherboard 252, antennas 254, a wireless module 256, and a transmission line 258.

Figure 2C:
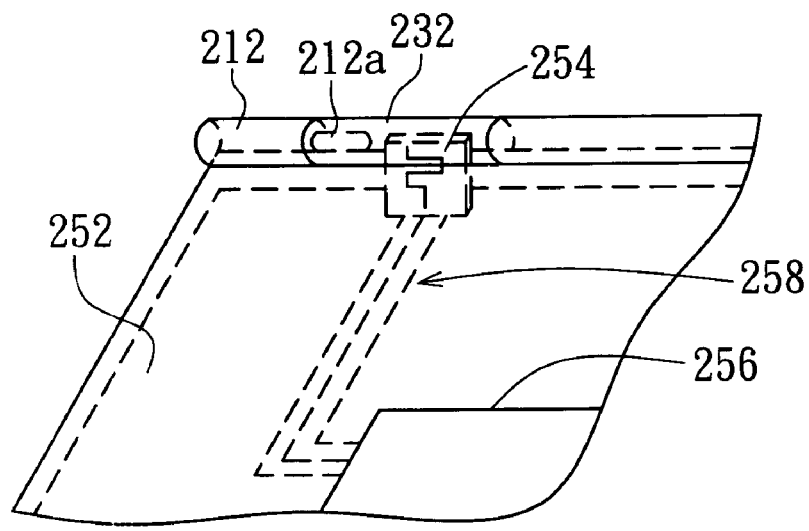
FIG. 2C is a schematic view of the configuration of the antenna in FIG. 2B in the region for inserting the hinge.

Different from the antenna disposed at the upper edge of the LCD, and transmitting signals via a RF coaxial cable in the prior art, the feature of the concealed antenna system in the invention lies on the hinge 212a of the hinge part 212 that would not fill the region 232 for inserting the hinge 212a, so the antenna 254 can be configured in the remained space of the region 232 for inserting the hinge 212a and installed on the motherboard 252 as shown in FIG. 2C. The antenna 254, such as an SMD-typed antenna, can be directly welded on the motherboard 252, and antenna signals can be transmitted to the wireless module 256 electrically coupled with the motherboard 252 via the transmission line 258 on the motherboard 252. The transmission line 258 can be a stripline or a microstrip-line, and the wireless module 256 can be a wireless local area network (WLAN) module, a mobile phone module, or a bluetooth wireless module. The notebook computer 200 has generally two regions 232 for inserting the hinges 212a, located on the base module 220, and each of the regions 232 for inserting the hinges 212a can be used for configuring an antenna 254, thus achieving antenna diversity.

Figure 3A:
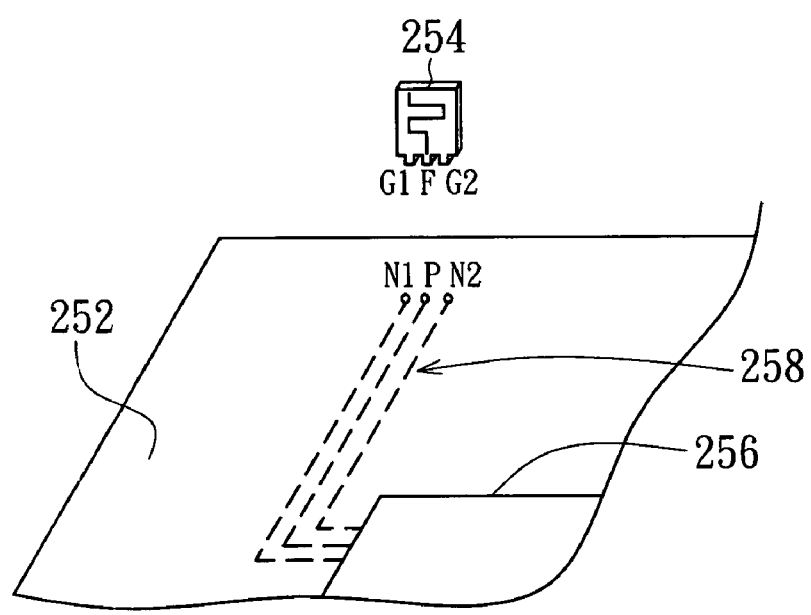
FIG. 3A is a schematic view of the insertion of the SMD-typed antenna into the motherboard according to a preferred embodiment of the invention.

Referring to FIG. 3A, a schematic view of the insertion of the antenna into the motherboard 252 according to a preferred embodiment of the invention is shown. The SMD-typed antenna 254 includes a feed-in end F, and ground ends G1, G2, and the part of the motherboard 252 under the region 232 for inserting the hinge 212a has a positive hole P and negative holes N1, N2 respectively for inserting the feed-in end F and the ground ends G1, G2. Two ground ends G1, G2 here are just taken for an example in the invention, however, the antenna 254 can have only one ground end or more than two ground ends.

Figure 3B:
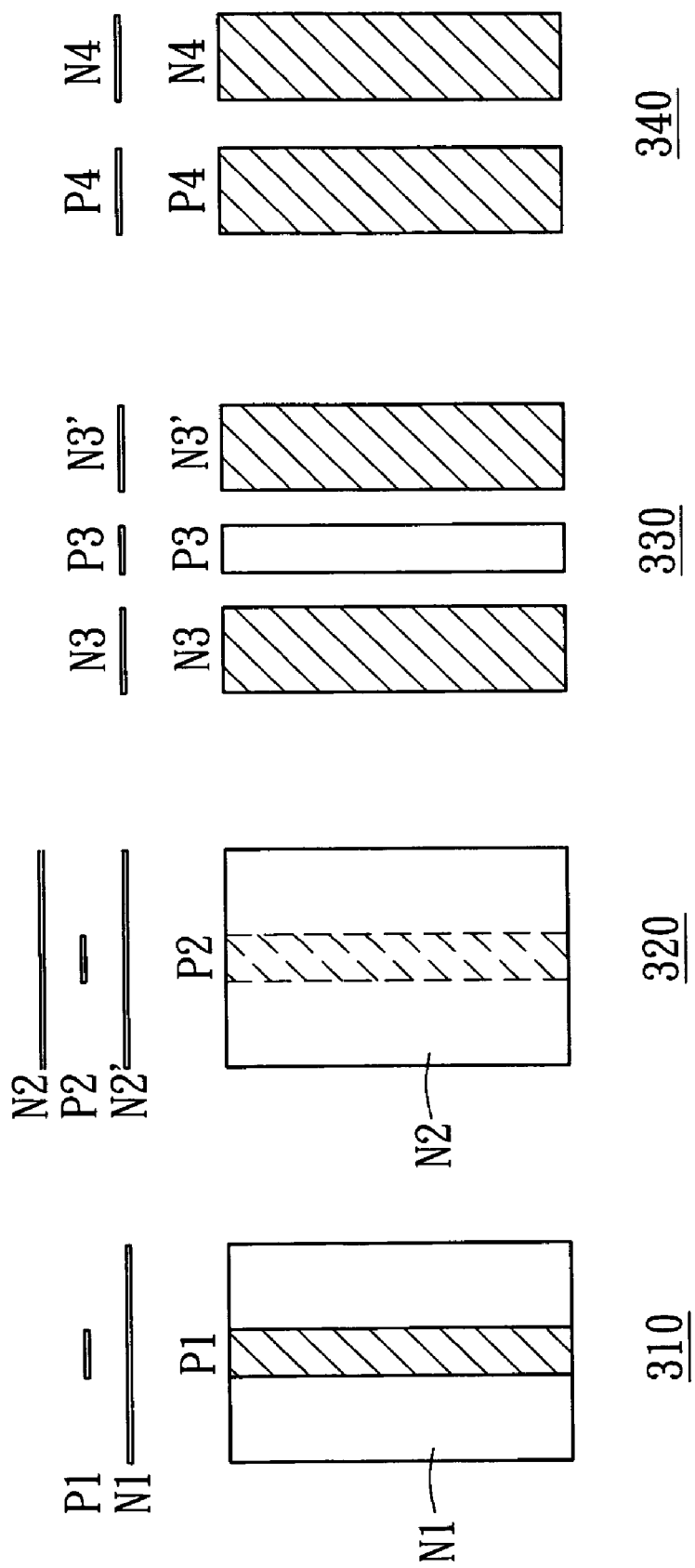
FIG. 3B shows a lateral view and a corresponding upper view of the transmission line in FIG. 3A.

Referring to FIG. 3B, a lateral view and a corresponding upper view of the transmission line 258 in FIG. 3A are shown. The motherboard 252 generally has a number of layers for wiring layout. The transmission line 258, disposed on the motherboard 252 in the invention, includes a positive line and a negative line. For example, the transmission line 258 can be a microstrip-line 310, which has a positive line P1, and a negative line N1 located under the positive line P1. Or the transmission line 258 can be a stripline 320, which has a positive line P2, and negative lines N2, N2' respectively located above and under the positive line P2. Or the transmission line 258 can be a co-planar waveguide line, which has a positive line P3, and negative lines N3, N3' on the same plane with the positive line P3 located between the negative lines N3, N3'. Or the transmission line 258 can also be a slotline, which has a positive line P4 and a negative line N4 on the same layer.

Figure 3C:
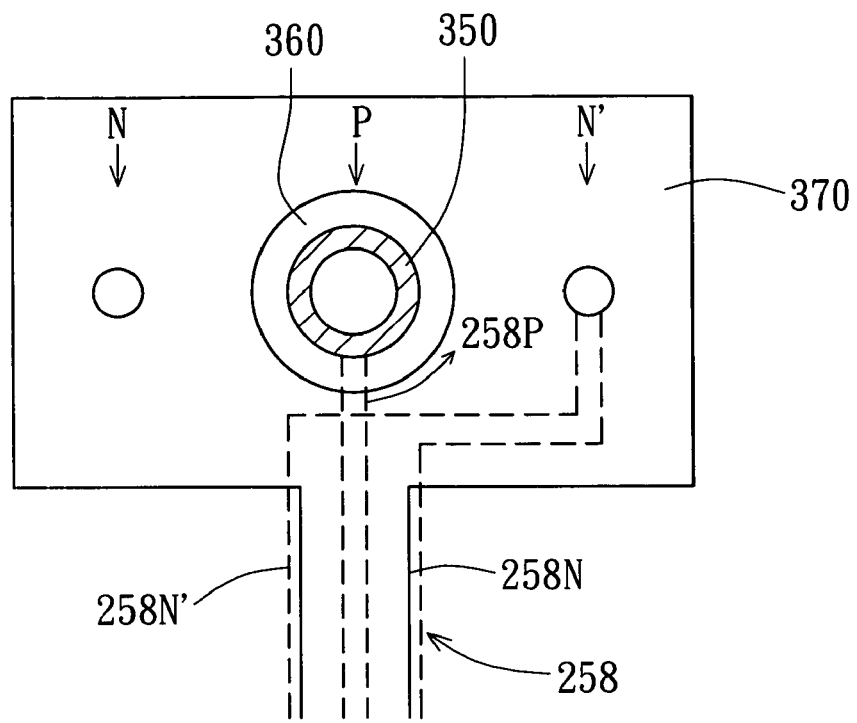
FIG. 3C is a schematic view of the connection of the positive hole and the negative hole on the motherboard with the transmission line in FIG. 3A.

Referring to FIG. 3C, a schematic view of the connection of the positive hole and the negative hole on the motherboard with the transmission line 258 in FIG. 3A is shown. The stripline 320 is taken as an example for the following illustration. A metal circle region 350 surrounds the positive hole P for connecting with the positive line 258P of the transmission line 258, and an insulation circle region 360 surrounds the metal circle region 350 for isolating the metal circle region 350 from the negative electrodes N, and N'. The negative electrodes N and N', disposed on the metal board 370, are respectively coupled with the negative line 258N (located on the layer above the positive line 258P) and the negative line 258N' (located on the layer under the positive line 258P). The antenna 254 in the invention is configured in the region 232 for inserting the hinge 212a, and is inserted vertically into the motherboard 252. The antenna 254 is higher than the surface of the motherboard 252, so the antenna 254 is not influenced by radiation from other devices on the motherboard 252. Moreover, the conventional RF coaxial cable is not needed for the antenna 254 in the invention, so the cost of manufacturing the antenna and fabricating the notebook computer can be reduced.

Although the SMD-typed antenna 254 is taken as an example in the invention, the antenna 254 is not limited to the SMD-typed one. Any other antenna, which can be configured in the region 232 for inserting the hinge 212a, and electrically coupled with the motherboard 252, will not depart from the spirit of the invention. For the wireless module 256, which is still not integrated onto the motherboard 252 as a unity in terms of present technique, an SMD RF connector can be used for connecting the antenna 254 and the wireless module 256. As for oncoming single-chip RF modules, such as a system-in-packet (SIP) module, and a system-on-a-chip (SOC) module, which will be integrated on the motherboard as a unity, the SMD-typed antenna 254 can be still inserted into the motherboard 252 and transmit signals to the RF module directly via the transmission line 258 on the motherboard 252. In terms of the motherboard equipped with the integrated chip, the antenna 254 can be also disposed at any other place on the motherboard 252 where the quality of transmitting antenna signals is not influenced. Since the RF coaxial cable is not needed, the cost of manufacturing antenna and fabricating the notebook computer will be reduced.

Figure 4:
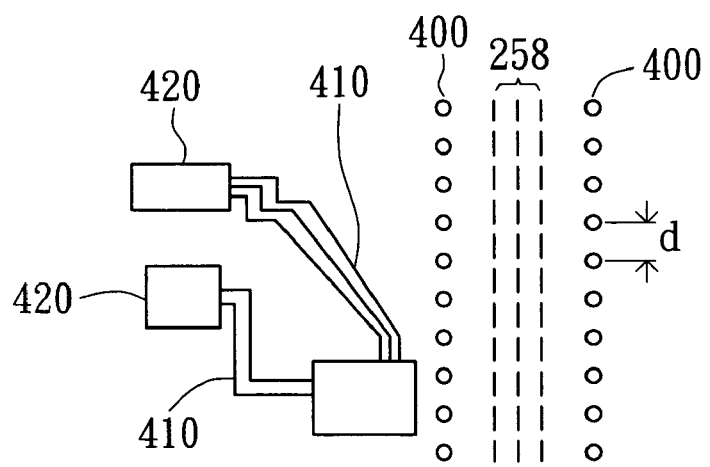
FIG. 4 is a schematic view of the configuration of vias along the transmission line in FIG. 3A.

In addition, to enhance the electromagnetic compatibility (EMC); a number of vias 400 are lined up along two sides of the transmission line 258 in the invention so as to improve the RF isolation of the transmission line 258 from other circuits on the motherboard 252 as shown in FIG. 4. The inner wall of each via 400 is plated with a metal layer. As the distance d between two adjacent vias 400 is smaller than one-tenth wavelength of the electromagnetic wave, the electromagnetic radiation of other circuits 410 or electronic devices 420 will be effectively isolated from the transmission line 258.

According to the above-mentioned preferred embodiment, the invention has the following advantages:

1. The SMD-typed antenna in the invention is directly mounted on the motherboard, and transmits signals to the wireless module via the transmission line on the motherboard without using the conventional RF coaxial cable as a transmission medium. Therefore, the cost of manufacturing the antenna system can be reduced significantly.

2. The SMD-typed antenna in the invention is directly welded on the motherboard without using the conventional RF coaxial cable so that the complicated fabrication process of the conventional antenna can be quitted. Therefore, the labor hours of fabricating the notebook computer can be shortened and the system fabrication cost can be reduced significantly.

3. The antenna, configured in the region for inserting the hinge, has a good compatibility with the original mechanism of the notebook computer. Therefore complicated modification is not needed in mechanism design and the antenna can have good RF features.

4. The antenna, mounted on the motherboard directly, can largely reduce its distance from the wireless module, and thus reduce the signal transmission loss. Therefore, the system reliability can be enhanced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A concealed antenna, applied in a notebook computer, the notebook computer comprising a displaying module and a base module, the displaying module comprising a hinge, the base module comprising a hinge cover, a motherboard, a wireless module, and a transmission line, the motherboard comprising a positive region and a negative region, the wireless module being mounted on the motherboard, the transmission line being disposed on the motherboard for electrically connecting the antenna and the wireless module, the concealed antenna comprising:
an antenna body comprising:
a feed-in end for electrically coupling with the positive region; and
a ground end for electrically coupling with the negative region;
wherein the hinge cover includes a region for inserting the hinge, by which the displaying module can be opened and closed with respect to the base module, the region having a space remaining after the hinge is inserted into the region, and
the antenna body of the concealed antenna is at least partially disposed in the remaining space of the region for inserting the hinge, and installed on the motherboard when the displaying module and the base module are integrated to form the notebook computer, and the concealed antenna transmits a signal from or receives a signal to the wireless module via the transmission line.

2. The concealed antenna according to claim 1, wherein the concealed antenna is a surface mounting device (SMD) typed antenna.

3. The concealed antenna according to claim 1, wherein the antenna is installed on the motherboard under the region for inserting the hinge.

4. The concealed antenna according to claim 1, wherein the transmission line is a microstrip-line.

5. The concealed antenna according to claim 1, wherein the transmission line is a stripline.

6. The concealed antenna according to claim 1, wherein the positive region and the negative region respectively comprise a positive hole and a negative hole, electrically coupled with the transmission line, for inserting the feed-in end and the ground end.

7. The concealed antenna according to claim 6, wherein a metal circle region surrounds the positive hole for connecting with a positive line of the transmission line, and the negative hole is connected to a negative line of the transmission line.

8. The concealed antenna according to claim 7, wherein an insulation circle region surrounds the metal circle region for isolating the metal circle region from the negative hole.

9. The concealed antenna according to claim 1, wherein the antenna body further includes a signal path on a plane, and the antenna body is mounted on the motherboard so that the plane is not parallel to the motherboard.

10. The concealed antenna according to claim 1, wherein the antenna body is vertically mounted on the motherboard so that the plane is vertical with respect to the motherboard.

11. A notebook computer, comprising:
a displaying module comprising a hinge; and
a base module comprising:
a motherboard;
a hinge cover including a region for inserting the hinge, by which the displaying module can be opened and closed relative to the base module, wherein the region has an opening remaining after the hinge is inserted into the region; and
an antenna mounted on the motherboard, and being at least partially disposed in the remaining opening of the region for inserting the hinge when the displaying module and the base module are integrated to form the notebook computer.

12. The notebook computer according to claim 11, wherein the antenna is an SMD-typed antenna.

13. The notebook computer according to claim 11, wherein the base module includes a transmission line on the motherboard for electrically connecting the antenna and a wireless module mounted on the motherboard.

14. The notebook computer according to claim 13, wherein the motherboard includes a positive hole and a negative hole, respectively connected to a positive line and a negative line of the transmission line, and provided for inserting a feed-in end and a ground end of the antenna.

15. The notebook computer according to claim 13, wherein the wireless module is a system-in-packet (SIP) RF module.

16. The notebook computer according to claim 13, wherein the wireless module is a system-on-a-chip (SOC) RF module.

17. The notebook computer according to claim 13, wherein the transmission line is a microstrip-line.

18. The notebook computer according to claim 13, wherein the transmission line is a stripline.

19. The notebook computer according to claim 13, wherein the transmission line is a co-planar waveguide line.

20. The notebook computer according to claim 13, wherein the transmission line is a slotline.

21. The notebook computer according to claim 13, wherein the motherboard comprises a plurality of vias lined up along the transmission line at a constant interval for isolating the transmission line from the electromagnetic radiation from a circuit or an electronic device on the motherboard.

22. The notebook computer according to claim 21, wherein the distance of the two adjacent vias is smaller than one-tenth wavelength of the electromagnetic wave.

23. The notebook computer according to claim 13, wherein the base module further comprises an upper cover, wherein when the displaying module is integrated with the base module to form the notebook computer, the region for inserting the hinge protrudes from the upper cover so that the antenna mounted on the motherboard is configured in the remaining opening of the region for inserting the hinge.

24. The notebook computer according to claim 13, wherein the antenna includes a signal path on a plane, the antenna being mounted on the motherboard so that the plane is not parallel to the surface of the motherboard.

25. The notebook computer according to claim 13, wherein the antenna is vertically mounted on the motherboard so that the plane is vertical with respect to the motherboard.

26. A foldable electronic apparatus, comprising:
a first module comprising a hinge; and
a second module comprising:
a motherboard;
a hinge cover having a region for inserting the hinge, by which the first module can be folded or unfolded with respect to the second module, wherein the region has an opening remaining after the hinge is inserted into the region; and
an antenna mounted on the motherboard, and configured in the remaining opening of the region for inserting the hinge when the first module is integrated with the second module to form the foldable electronic apparatus.

27. The foldable electronic apparatus according to claim 26, wherein the second module further comprises an upper cover, wherein when the first module is integrated with the second module to form the foldable electronic apparatus, the region for inserting the hinge protrudes from the upper cover so that the antenna mounted on the motherboard is configured in the remaining opening of the region for inserting the hinge.

28. The foldable electronic apparatus according to claim 26, wherein the antenna includes a signal path on a plane, and the antenna is mounted on the motherboard so that the plane is not parallel to the motherboard.

29. The foldable electronic apparatus according to claim 28, wherein the antenna is vertically mounted on the motherboard so that the plane is vertical with respect to the motherboard.

* * * * *